(12) United States Patent
Vandersall et al.

(10) Patent No.: US 6,620,348 B1
(45) Date of Patent: Sep. 16, 2003

(54) FIRE RETARDANT COMPOSITIONS CONTAINING METAL FERRITES FOR REDUCED CORROSIVITY

(75) Inventors: Howard L. Vandersall, Upland, CA (US); Gary H. Kegeler, Diamond Bar, CA (US); George J. Matousek, Fontana, CA (US)

(73) Assignee: Astaris, LLC, Saint Louis, MO (US)

( * ) Notice: Subject to any disclaimer, the term of this patent is extended or adjusted under 35 U.S.C. 154(b) by 0 days.

(21) Appl. No.: 10/128,190

(22) Filed: Apr. 23, 2002

(51) Int. Cl.⁷ ............ C09K 21/00; A62D 1/00
(52) U.S. Cl. .............. 252/602; 252/2; 252/7; 252/603; 252/389.53
(58) Field of Search ................ 252/389.53

(56) References Cited

U.S. PATENT DOCUMENTS

| | | | |
|---|---|---|---|
| 3,634,234 A | * | 1/1972 | Nelson ................ 252/7 |
| 3,730,890 A | * | 5/1973 | Morgenthaler ............ 252/7 |
| 4,268,432 A | | 5/1981 | Maslen et al. ........ 260/45.75 B |
| 4,383,064 A | | 5/1983 | Iida ................ 524/100 |
| 4,490,498 A | | 12/1984 | Yokota et al. ........ 524/371 |
| 4,839,065 A | | 6/1989 | Vandersall ............ 252/603 |
| 5,674,931 A | | 10/1997 | Gallagher et al. ........ 524/414 |

OTHER PUBLICATIONS

USDA, Forest Service, Specification for Long Term Retardant, Wildland Fire, Aircraft or Ground Application, Specification 5100–304B Jan. 2000, superceding Specification 5100–304a Feb., 1986.

* cited by examiner

*Primary Examiner*—Matthew A. Thexton
(74) *Attorney, Agent, or Firm*—Thompson Coburn, LLP

(57) ABSTRACT

Fire retardant compositions comprise at least one ammonium polyphosphate, at least one suspending agent, and at least one metal ferrite. In specific embodiments, the compositions of the invention comprise zinc ferrite or magnesium ferrite.

51 Claims, No Drawings

FIRE RETARDANT COMPOSITIONS CONTAINING METAL FERRITES FOR REDUCED CORROSIVITY

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to ammonium polyphosphate fire retardants. More specifically, the present invention relates to ammonium polyphosphate fire retardants containing metal ferrites for reduced aluminum corrosion.

BACKGROUND OF THE INVENTION

Aerial application of fire retardant compositions to combat the spread of wildland fires is common. The composition of fire retardant concentrates designed for managing and controlling wildland fires are of two general types, those which, when mixed or diluted with water to end-use concentration result in a gum-thickened solution, and those that do not contain a gum thickener, which are water-like solutions. The former may be supplied as dry powders or as suspensions or slurries, and are generally referred to as fluids. Those concentrates that result in water-like solutions when diluted with water may contain suspended components, as well, but are generally referred to as liquid concentrates. Fire retardant concentrates that are supplied as fluids or liquids are preferred by some because they can be diluted simply and easily to end-use strength with little mixing hardware and manpower.

Fertilizer grade ammonium polyphosphate solutions, discussed in greater detail infra, have been used as aerially applied fire retardants. These liquids have certain advantages in comparison to other fire-suppressing compositions since they can be transported and stored in the liquid form prior to use rather than being mixed from dry ingredients. However, concentrated liquid fire retardants and solutions prepared therefrom are extremely corrosive to aluminum and brass and mildly corrosive to other materials of construction used in handling, storage and application equipment. As used herein, all references to metals implicitly include reference to alloys thereof as well. Accordingly, aluminum encompasses aluminum 2024T3, 6061 and 7074, references to steel encompass 1010 and 4130 steel, and brass encompasses yellow and naval brass. Since wildland fire retardants are most frequently transported to the fire and applied aerially, it is imperative that corrosive damage to the materials of construction of fixed-wing aircraft and helicopters be minimized.

Accordingly, the United States Department of Agriculture ("USDA") Forest Service has established, in "Specification 5100-304b (January 2000) Superseding Specification 5100-00304a (February 1986)," entitled "Specification for Long Term Retardant, Wildland Fire, Aircraft or Ground Application" (hereinafter, "Forest Service Specifications"), hereby incorporated by reference, maximum allowable corrosion rates, and methods for calculating such corrosion rates for 2024T3 aluminum, 4130 steel, yellow brass and Az-31-B magnesium. For example, the corrosivity of forest fire retardants, in concentrate, to aluminum, steel and yellow brass must not exceed 5.0 milli-inches ("mils") per year as determined by the "Uniform Corrosion" test set forth in Section 4.3.5.1 of the aforementioned USDA, Forest Service Specifications. If the product is applied from fixed-tank equipped helicopters, in addition to the above requirements, the corrosivity of the fire retardants to magnesium must not exceed 5.0 mils per year ("mpy"). The Forest Service Specifications identify the maximum amount of corrosion acceptable when both the retardant concentrate and its diluted solutions are exposed to each metal indicated above at temperatures of 70° Fahrenheit ("F") and 120°F. in both totally and partially immersed configurations. The maximum allowable corrosivity of aerially applied fire retardant diluted solutions to aluminum is 2.0 mpy, and the maximum corrosivity to brass and to steel is 5.0 mpy when totally immersed, and 2.0 mpy when tested in the partially immersed condition. In the partially immersed configuration, one-half of the coupon is within the solution and one-half is exposed to the vapors in the air space over the solution.

Sodium ferrocyanide has historically been incorporated into the corrosive compositions in an effort to address the corrosivity problems encountered with the use of fertilizer grade ammonium polyphosphates. Sodium ferrocyanide has proved to be an effective corrosion inhibitor in fire retardant compositions containing ammonium polyphosphate fertilizer solutions. However, while sodium ferrocyanide is effective as a corrosion inhibitor, several disadvantages of its use make its incorporation in wildland fire retardant compositions undesirable. Specifically, the environmental and toxicological safety of ferrocyanides as well as ferricyanides is, at best, questionable. When exposed to acidic conditions and/or ultraviolet radiation from natural sunlight, the ferro(i)cyanide radical readily degrades releasing cyanide and/or hydrogen cyanide, which are toxic to humans, animals and aquatic life. Further, free iron emanating either from decomposition of a portion of the ferrocyanide radical, or introduced from other components or impurities within the composition, will subsequently react with remaining non-decomposed ferro(i)cyanide to form ferrous ferricyanide ("Tumbull's Blue") or ferric ferrocyanide ("Prussian Blue"), which emit a persistent blue-black or indigo-blue coloration, staining all that they contact. Consequently, neither ferricyanide nor ferrocyanide can be used in fire retardants that are expected to fade and to become non-visible over time, for example, in fugitive retardant compositions.

The magnitude of the above concerns is increased since wildland fire retardants are generally applied aerially in a less than completely controlled manner. Due to the presence of variables such as vegetative cover, smoke, or wind drift that impact the trajectory of the free-falling solution, aerially applied wildland fire retardant solutions may land on or near people, animals and in bodies of water, or on soil where it could enter the water supply.

Accordingly, there is a need to provide safe and acceptable wildland fire retardants for the suppression or management of wildland fires that are not corrosive to the equipment associated with the transportation, handling and application of the retardant, and are environmentally and toxicologically friendly, thereby avoiding the above disadvantages.

SUMMARY OF THE INVENTION

In one aspect of the invention, fire retardant compositions are provided that comprise at least one ammonium polyphosphate, at least one suspending agent and at least one metal ferrite.

In a second aspect of the invention, the above-described fire retardant compositions are provided that comprise at least one gum thickener.

In a third aspect of the invention, the above-described fire retardant compositions comprising at least one gum thickener comprise at least one gum thickener that is a biopolymer with a median particle diameter less than 100 microns.

In a fourth aspect of the invention, the above-described fire retardant compositions of the invention comprise zinc ferrite.

In a fifth aspect of the invention, the above-described fire retardant compositions of the invention comprise magnesium ferrite.

In a sixth aspect of the invention, methods of making dilute fire retardant compositions of the invention, adapted for aerial application to wildland fires, are provided that comprise forming an intermediate concentrate composition comprising the above-described composition of the invention and diluting the intermediate concentrate with water to form the dilute fire retardant composition of the invention.

In a seventh aspect of the invention, methods of retarding or suppressing wildland fires are provided that comprise the step of aerially applying a fire retardant composition comprising the diluted fire retardant compositions of the invention to wildland vegetation.

BRIEF DESCRIPTION OF THE DRAWINGS

Not applicable.

DETAILED DESCRIPTION

In accordance with the present invention, it has been discovered that fire retardant compositions can be prepared that have a reduced tendency to corrode various metals, including aluminum, that are superior to known fire retardants in rheological aerial application characteristics and are toxicologically and environmentally safe. The fire retardant composition is comprised of at least one fertilizer grade ammonium polyphosphate retardant, at least one suspending agent, and at least one metal ferrite.

Ammonium polyphosphate is also referred to as polyammonium phosphate and may include both ortho- and polyphosphate, other ammonium phosphates such as pyro- and metaphosphates, the alkali metal equivalents thereof, as well as a blend of phosphate polymers. The ammonium polyphosphate solutions that are used as agricultural fertilizer and wildland (vegetative) fire retardants are manufactured by neutralizing aqueous solutions of wet-process phosphoric acid, generally containing about 68% to about 74% phosphorus pentoxide with anhydrous ammonia in such a manner that both high temperature and pressure are experienced. When prepared in this manner, a portion of the impure orthophosphoric acid polymerizes or condenses, resulting in the formation of pyrophosphate, short chain polyphosphates and, in most instances, small amounts of cyclic or metaphosphates. That portion of the acid that does not polymerize, of course, remains as orthophosphoric acid. Ammoniation of this mixture of phosphate species occurs within the reactor, as well, resulting in an aqueous solution containing ammonium ortho, pyro, tripoly, tetrapoly and some higher chain and cyclic phosphate species. These condensed phosphates generally exhibit increased water solubility as compared to orthophosphates and, consequently, more highly concentrated solutions can be prepared when they are present. The relative concentrations of the various species depends primarily on the temperature and pressure achieved within the reactor. Commercial solutions generally contain from about 34% to about 37% phosphorus pentoxide. Phosphorus pentoxide concentrations above about 37% approach water solubility limits resulting in solutions that are not stable, from which solids may precipitate during ambient temperature storage. Solutions of this type are generally referred to as either 10-34-0 or 11-37-0 liquid concentrates; the numerical designation refers to the percentage of their plant nutrient composition, i.e., ammoniacal nitrogen, phosphorus pentoxide and potassium oxide, respectively.

It should be noted that the condensed phosphates that are present in liquid concentrate solutions are subject to hydrolyses that results in de-polymerization. The rate of hydrolytic degradation increases with time, temperature, and the relative acidity of the solution. Therefore, ammnonium polyphosphate concentrates and their solutions may vary in species composition as received, and as time progresses during their subsequent storage.

These liquid concentrates may additionally contain small amounts of diammonium sulfate and a host of metal and alkali-metal impurities. The quantity and quality of these impurities vary with the composition of the phosphate ore, the utilized process and the extent of purification that is conducted during manufacture of the wet-process phosphoric acid. Since these solutions are manufactured primarily as nutrients, the quality control parameters of greatest interest are the percentages of their contained nutrients, nitrogen and phosphorus, and the clarity, stability and color of the solution rather than purity per se.

The compositions of the invention comprise at least one metal ferrite, also known as a mixed oxide. Any metal ferrite may be used in accordance with the invention. However, in a specific embodiment of the invention zinc ferrite is employed. Zinc ferrite is a tan, dry powder of the general formula $ZnO.Fe_2O_3$. The typical composition of zinc ferrite is 33% ZnO and 66% $Fe_2O_3$.

In another specific embodiment of the invention, magnesium ferrite is employed. Magnesium Ferrite is a tan, dry powder of the general formula $MgO.Fe_2O_3$. The typical composition of magnesium ferrite is 19% MgO and 79% $Fe_2O_3$.

Generally, the metal ferrites of the invention are present in the fire retardant compositions of the invention, in an amount sufficient to substantially reduce the corrosiveness of the fire retardant to aluminum over that of the fire retardant composition without the metal ferrite. In a specific embodiment, the metal ferrites are present in the compositions of the invention in concentrate, in an amount sufficient to impart to the fire retardant compositions of the invention a maximum corrosivity of aluminum of 5.0 mils per year, as determined by the Forest Service Specifications. In another embodiment of the invention, the metal ferrite makes up less than about 5%, by weight, of the fire retardant composition of the invention. In yet another embodiment of the invention, the metal ferrite makes up about 5%, by weight, of the fire retardant composition of the invention. In a further embodiment of the invention, the metal ferrite makes up about 1.2%, by weight, of the fire retardant composition of the invention.

In one embodiment of the invention, the above-described fire retardant compositions of the invention comprise at least one amnonium polyphosphate, at least one suspending agent, at least one gum thickener, and at least one metal ferrite.

In one embodiment of the invention, a small amount of at least one gum thickener is added to the fire retardant compositions of the invention. The addition of a gum thickener to the fire retardant compositions of the invention imparts improved rheological arial application characteristics to the compositions. Specifically, the fire retardant compositions of the invention have improved elasticity when compared to compositions that do not comprise a gum thickener. In one embodiment, the gum thickener is a biopolymer having a weight average particle diameter less than about 100 microns. Gum thickeners suitable for use in the present invention include, but are not limited to rhamsan, xanthan and welan biopolymers having weight average particle diameters less than about 100 microns.

In one specific embodiment, the fire retardant compositions of the invention comprise at least one ammonium polyphosphate, at least one suspending agent, at least one gum thickener, wherein the gum thickener is a biopolymer with a median particle diameter less than 100 microns, and about 1.2%, by weight, zinc ferrite.

In another specific embodiment of the invention, the fire retardant compositions comprise at least one ammonium polyphosphate, at least one suspending agent, at least one gum thickener, wherein the gum thickener is a biopolymer with a median particle diameter less than 100 microns, and about 1.2%, by weight, magnesium ferrite.

The fire retardant compositions of the invention also comprise at least one suspending agent. Suspending agents reduce the rate of separation and settling during long term storage. Thus, as one skilled in the art would appreciate, the amount of suspending agent depends upon its relative effectiveness per unit applied, the desired length of storage, and the additional additives incorporated into the compositions of the invention. As used herein, suspending agents useful in the compositions of the invention include colloidal clays, for example, Attapulgus, Fuller's earth, Sepiolite, Montmorillonite, Kaolin clays, and mixtures thereof. As used herein, Attapulgus clay includes, but is not limited to attapulgite and polygorskite. As used herein, Kaolin clay includes, but is not limited to Kaolinite, $[Al_2Si_2O_7—2(H_2O)]$ and $[Al_2O_3—2SiO_2—2(H_2O)]$.

Dilute fire retardant compositions of the invention, specially adapted for aerial application to wildland fires, are prepared by forming an intermediate concentrate composition comprising the above-described fire retardant compositions of the invention. The compositions of the invention generally comprise at least one ammonium polyphosphate, at least one suspending agent and at least one metal ferrite, but may contain other additives, such as gum thickeners, as discussed herein. The intermediate concentrate is then diluted with water to form the dilute fire retardant compositions of the invention. The water used may be tap water, or water from other convenient water sources. Generally, the compositions of the invention are blended with water to form dilute solutions containing the amount of phosphorus pentoxide required to meet Forest Service Specifications. This concentration, which is determined via combustion-retarding effectiveness testing described in Forest Service Specification 5100-304b, "4.5.2. Combustion Retarding Effectiveness Test," will generally depend on the percentage of phosphorus pentoxide present in the concentrated composition and the extent of its availability for retarding reactions. The fire retardant compositions of the invention are typically diluted to an amount effective to achieve maximum coverage of vegetation at an application rate sufficient to reduce the flammable fuels to a desired level. The dilution rate necessary to meet the Forest Service Specifications for combustion retarding effectiveness is generally about one part concentrated fire retardant to about eight volumes of water. In a specific embodiment, the compositions of the invention are diluted one part concentrated fire retardant to about four to six parts water.

The fire retardant compositions of the invention are used, generally, to retard wildland fires. To retard wildland fires, the fire retardant compositions of the invention are diluted with water and applied on threatened vegetation, ahead of approaching wildland fire. Ammonia from both the ammonium phosphate and the ammonium sulfate are liberated at temperatures below the ignition temperature of the fuel. The phosphoric and sulfuric acids are both initially effective fire retarding acids. The phosphoric acid will remain present and effective with the vegetative fuel until temperatures exceed 600° C. However, the boiling point of sulfuric acid is much lower and the amount present will decrease as fuel temperature increases. Thus, at least a portion of the sulfuric acid is lost at the ignition temperature of the fuel. The resultant mineral acids subsequently react with the cellulosic components of vegetative fuels on which they are applied. Their thermal decomposition is thereby altered in such a manner that they will no longer serve as fuel. These reactions are described in U.S. Pat. No. 4,839,065 to Vandersall, which is hereby incorporated by reference in its entirety.

As will be apparent to those skilled in the art, the fire retardant compositions of the invention may contain or be mixed with other functional components or additives such as coloring agents, surfactants, stabilizers, opacifying agents, other corrosion inhibitors, any combination thereof, or with other functional components. Suitable coloring agents include both fugitive and non-fugitive coloring agents.

All references and patents cited herein are hereby incorporated by reference in their entireties for their relevant teachings. Accordingly, any reference cited herein and not specifically incorporated by reference is, nevertheless, incorporated by reference in its entirety as if part of the specification.

The following examples illustrate specific embodiments of the invention without limiting the scope of the invention in any way. In each example, samples of fertilizer grade ammonium polyphosphate fire retardant concentrate are mechanically admixed with the indicated ferrite or iron oxide. Any mechanical mixing technique that is well known in the art may be used in the present invention. The "Requirements" row indicates the level of 2024-T3 corrosion allowed by the USDA, Forest Service Specifications 5100-304b, i.e., the maximum allowable corrosivity for product acceptance for use in wildland fire retardant compositions. The resulting samples were tested for corrosivity in accordance with USDA, Forest Service Specifications 5100-304b.

EXAMPLES

Example 1

Ammonium polyphosphate type fire retardants containing mixtures of water insoluble iron oxide and/or metal ferrites and Attapulgus clay were tested for aluminum corrosivity. Ten samples were prepared by admixing 1.2% by weight of each of the iron oxides and metal ferrites indicated in Table 1 below, along with 1.4%, by weight, of Attapulgus clay, to concentrated liquid ammonium polyphosphate. The admixing was accomplished using a high shear mixer to wet and hydrate the clay in the concentrated polyphosphate liquid. The ferrites used were manufactured by the Colombian Division of Cities Service Corporation. Aliquots of the resultant concentrates were then diluted with tap water at mix ratios of 4.25 volumes of water per volume of concentrate.

The aluminum corrosivity of the resultant fire retardant concentrates and their diluted solutions were determined in accordance with Forest Service Specifications. Specifically, a one-inch wide, four-inch long, one-eighth-inch thick coupon of aluminum was obtained from a standard source. The coupon was cleaned, dried and weighed according to standard Forest Service Specifications and suspended in a one-quart, straight sided jar filled either 50% (partially) or 100% (totally) full using a piece of nylon string. When suspended in a partially full jar, the coupon was 50% (two inches) immersed in the test solution with the other 50% extending up from the solution into the air space above it. When the jar was full with approximately 800 ml of the solution, the metal coupon was totally immersed in the solution. The jars were then closed with a screw cap and two or three identical corrosion jars (cells) of each partially and totally immersed coupons were stored at 70° F. and 120° F. for ninety days. At the end of the ninety-day storage period, the jars were opened and the coupons were removed and cleaned according to the Forest Service Specifications. The coupon was then re-weighed after it dried and its weight loss was determined by comparing its initial and final weights. The calculated weight loss and density of the metal coupon were used to extrapolate to mils (0.001 inches) of aluminum that would be lost during a one-year period at the test condition, assuming that the weight loss was experienced uniformly across the coupon surface. The corrosion rates of both the partially and totally immersed coupons were calculated using the total surface area of the coupon. The samples at each condition were then averaged and reported as the corrosion rate.

sium ferrite appear to be more effective in reducing the aluminum corrosion of both concentrated and diluted ammonium polyphosphate fire retardants than any iron oxide/attapulgus clay mixture.

In view of the above, it is seen that the various objects and features of the invention are achieved and other advantages and results are obtained. Variations and modification may be made to the various steps and compositions of the invention without departing from the scope of the invention.

We claim:

1. A fire retardant composition comprising:
   at least one ammonium polyphosphate;
   at least one suspending agent; and
   at least one metal ferrite.

2. The composition of claim 1 wherein said fire retardant composition comprises less than about 5% by weight of said at least one metal ferrite.

3. The composition of claim 1 wherein said fire retardant composition comprises about 5% by weight of said at least one metal ferrite.

4. The composition of claim 1 wherein said at least one metal ferrite is zinc ferrite.

5. The composition of claim 1 wherein said at least one metal ferrite is magnesium ferrite.

6. The composition of claim 1 wherein said at least one suspending agent is at least one agent selected from a group consisting of Attapulgus clay, Sepiolite clay, Fuller's earth clay, Montmorillonite clay, Kaolin clay, and mixtures thereof.

7. The composition of claim 1 further comprising at least one additive selected from a group consisting of a coloring

TABLE 1

Corrosion Rate of 2024-T3 Aluminum Exposed to Ammonium Polyphosphate Solution Containing
1.4% Attapulgus Clay and 1.2% of Various Water Insoluble Metal Oxides and Ferrites

| | Water Insoluble Metal Oxide Additive | | 90 Day Corrosion (MPY) | | | | | | | |
|---|---|---|---|---|---|---|---|---|---|---|
| | | | Concentrate | | | | Dilute | | | |
| Sample | | | 70° F. | 70° F. | 120° F. | 120° F. | 70° F. | 70° F. | 120° F. | 120° F. |
| Number | Comp. | Type | total | partial | total | partial | total | partial | total | partial |
| Requirements | | | ≦5.0 | ≦5.0 | ≦5.0 | ≦5.0 | ≦2.0 | ≦2.0 | ≦2.0 | ≦2.0 |
| 1. | — | none | | | 168.5 | | | | 7.4 | |
| 2. | — | none | 5.3 | 3.7 | 92.4 | 56.2 | 11.2 | 6.1 | 3.8 | 5.0 |
| 3. | — | none | 6.0 | 3.3 | 105.0 | 65.1 | 10.9 | 6.9 | 2.5 | 5.3 |
| 4. | $Fe_2O_3$ | Kroma red, pptd | 2.0 | 2.0 | 3.8 | 4.0 | 2.7 | 3.5 | 2.4 | 4.4 |
| 5. | $Fe_2O_3$ | Kroma red, pptd | 1.1 | 0.7 | 6.1 | 2.6 | 3.8 | 3.8 | 1.4 | 2.9 |
| 6. | $Fe_2O_3$ | Kroma red, pptd | 1.8 | 1.5 | 2.6 | 3.4 | 1.8 | 3.2 | 1.0 | 3.0 |
| 7. | $Fe_2O_3$ | Kroma red, pptd | 1.5 | 1.5 | 1.7 | 2.3 | 1.8 | 2.6 | 1.9 | 3.1 |
| 8. | $Fe_2O_3$ | Copperas red, cal. | 1.5 | 1.4 | 1.7 | 1.7 | 2.2 | 2.6 | 1.6 | 2.5 |
| 9. | $Fe_2O_3$ | Copperas red, cal. | 1.4 | 1.3 | 1.5 | 2.0 | 2.1 | 2.4 | 1.6 | 2.8 |
| 10. | $Fe_2O_3$ | Copperas red, cal. | 1.5 | 1.3 | 1.5 | 2.4 | 2.0 | 2.4 | 1.5 | 3.0 |
| 11. | $Fe_2O_3$ | Copperas red, cal. | 0.6 | 0.6 | 2.8 | 1.2 | 4.1 | 3.5 | 1.5 | 2.5 |
| 12. | $Fe_2O_3$ | Copperas red, cal. | 1.4 | 1.3 | 1.5 | 2.2 | 1.4 | 2.3 | 1.8 | 2.8 |
| 13. | $Fe_2O_3$ | Red, calcined scrap metal | 2.5 | 1.8 | 3.0 | 3.1 | 1.9 | 2.5 | 1.9 | 2.8 |
| 14. | $ZnO \cdot Fe_2O_3$ | Tan, Mixed oxides | | | 1.2 | | | | 3.5 | |
| 15. | $ZnO \cdot Fe_2O_3$ | Tan, Mixed oxides | 1.6 | 1.4 | 1.2 | 1.5 | 1.6 | 2.1 | 1.6 | 2.4 |
| 16. | $MgO \cdot Fe_2O_3$ | Tan, Mixed oxides | | | 1.3 | | | | 3.3 | |
| 17. | $MgO \cdot Fe_2O_3$ | Tan, Mixed oxides | 1.7 | 1.5 | 1.3 | 1.4 | 1.6 | 2.6 | 1.3 | 1.9 |

The data indicate that while the addition of a mixture of various iron oxides and Attapulgus clay is effective in reducing the aluminum corrosivity of concentrated ammonium polyphosphate, none of the mixtures are sufficient to adequately inhibit the corrosivity of diluted ammonium polyphosphate solutions. However, both zinc and magneagent, surfactant, stabilizer, corrosion inhibitor, opacifying pigment, and any mixture thereof.

8. The composition of claim 7 wherein said coloring agent is at least one coloring agent selected from a group consisting of fugitive and non-fugitive coloring agents.

9. The composition of claim 1 wherein said fire retardant composition comprises about 1.2% by weight of said at least one metal ferrite.

10. The composition of claim 1 wherein said at least one metal ferrite is present in said fire retardant composition, in concentrate, in an amount effective to impart to the fire retardant composition a maximum corrosivity of aluminum of 5.0 mils per year, as determined by the Forest Service Specifications.

11. The composition of claim 1 further comprising water.

12. The composition of claim 1 further comprising at least one gum thickener.

13. The composition of claim 12 wherein the at least one gum thickener is a biopolymer with a median particle diameter less than 100 microns.

14. A fire retardant composition as set forth in claim 1, comprising:
    at least one ammonium polyphosphate;
    at least one suspending agent;
    at least one gum thickener, wherein said gum thickener is a biopolymer with a median particle diameter less than 100 microns; and
    about 1.2% by weight zinc ferrite.

15. A fire retardant composition as set forth in claim 1, comprising:
    at least one ammonium polyphosphate;
    at least one suspending agent;
    at least one gum thickener, wherein said gum thickener is a biopolymer with a median particle diameter less than 100 microns; and
    about 1.2% by weight magnesium ferrite.

16. A fire retardant composition comprising:
    at least one ammonium polyphosphate;
    at least one suspending agent;
    at least one gum thickener; and
    at least one metal ferrite.

17. The composition of claim 16 wherein said fire retardant composition comprises less than about 5% by weight of said at least one metal ferrite.

18. The composition of claim 16 wherein said fire retardant composition comprises about 5% by weight of said at least one metal ferrite.

19. The composition of claim 16 wherein said at least one metal ferrite is zinc ferrite.

20. The composition of claim 16 wherein said at least one metal ferrite is magnesium ferrite.

21. The composition of claim 16 wherein said at least one suspending agent is at least one agent selected from a group consisting of Attapulgus clay, Sepiolite clay, Fuller's earth clay, Montmorillonite clay, Kaolin clay, and mixtures thereof.

22. The composition of claim 16 further comprising at least one additive selected from a group consisting of a coloring agent, surfactant, stabilizer, corrosion inhibitor, opacifying pigment, and any mixture thereof.

23. The composition of claim 22 wherein said coloring agent is at least one coloring agent selected from a group consisting of fugitive and non-fugitive coloring agents.

24. The composition of claim 16 wherein said fire retardant composition comprises about 1.2% by weight of said at least one metal ferrite.

25. The composition of claim 16 wherein said at least one metal ferrite is present in said fire retardant composition, in concentrate, in an amount effective to impart to the fire retardant composition a maximum corrosivity of aluminum of 5.0 mils per year, as determined by the Forest Service Specifications.

26. The composition of claim 16 further comprising water.

27. The composition of claim 16 wherein the at least one gum thickener is a biopolymer with a median particle diameter less than 100 microns.

28. A method of preparing a dilute fire retardant composition, adapted for aerial application to wildland fires, the method comprising the steps of:
    (a) forming an intermediate concentrate composition comprising:
        (i) at least one ammonium polyphosphate;
        (ii) at least one metal ferrite;
        (iii) at least one suspending agent; and
    (b) diluting said intermediate concentrate with water to form said dilute fire retardant composition.

29. The method of claim 28 wherein said intermediate concentrate composition comprises less than about 5% by weight said at least one metal ferrite.

30. The method of claim 28 wherein said intermediate concentrate composition comprises about 5% by weight said at least one metal ferrite.

31. The method of claim 28 wherein said at least one metal ferrite is zinc ferrite.

32. The method of claim 28 wherein said at least one metal ferrite is magnesium ferrite.

33. The method of claim 28 wherein said at least one suspending agent is at least one agent selected from a group consisting of Attapulgus clay, Sepiolite clay, Fuller's earth clay, Montmorillonite clay, Kaolin clay, and mixtures thereof.

34. The method of claim 28 further comprising at least one additive selected from a group consisting of a coloring agent, surfactant, stabilizer, corrosion inhibitor, opacifying pigment, gum thickener, and any combination thereof.

35. The method of claim 34 wherein said coloring agent is at least one agent selected from a group consisting of fugitive and non-fugitive coloring agents.

36. The method of claim 28 wherein said intermediate concentrate composition comprises about 1.2% by weight of said at least one metal ferrite.

37. The method of claim 28 wherein said at least one metal ferrite is present in said fire retardant composition, in concentrate, in an amount effective to impart to said dilute fire retardant composition a maximum corrosivity of aluminum of 5.0 mils per year, as determined by the Forest Service Specifications.

38. The method of claim 37 wherein said intermediate concentrate composition further comprises at least one gum thickener.

39. The method of claim 38 wherein said at least one gum thickener is a biopolymer with a median particle diameter less than 100 microns.

40. A method of preparing a dilute fire retardant composition, adapted for aerial application to wildland fires, the method comprising the steps of:
    (a) forming an intermediate concentrate composition comprising:
        (i) at least one ammonium polyphosphate;
        (ii) about 1.2% by weight zinc ferrite;
        (iii) at least one gum thickener, wherein said at least one gum thickener is a biopolymer with a median particle diameter less than 100 microns; and
        (iv) at least one suspending agent; and
    (b) diluting said intermediate concentrate with water to form said dilute fire retardant composition.

41. A method of preparing a dilute fire retardant composition, adapted for aerial application to wildland fires, the method comprising the steps of:

(a) forming an intermediate concentrate composition comprising:
   (i) at least one ammonium polyphosphate;
   (ii) about 1.2% by weight magnesium ferrite;
   (iii) at least one gum thickener, wherein said at least one gum thickener is a biopolymer with a median particle diameter less than 100 microns; and
   (iv) at least one suspending agent; and
(b) diluting said intermediate concentrate with water to form said dilute fire retardant composition.

42. A method of retarding wildland fires comprising aerially applying to wildland vegetation the composition of claim 11.

43. The method of claim 42 wherein said fire retardant composition further comprises at least one additive selected from a group consisting of a coloring agent, surfactant, stabilizer, corrosion inhibitor, opacifying pigment, gum thickener, and any combination thereof.

44. The method of claim 43 wherein said coloring agent is at least one agent selected from a group consisting of fugitive and non-fugitive coloring agents.

45. The method of claim 42 wherein said fire retardant composition comprises less than about 5% by weight of said at least one metal ferrite.

46. The method of claim 42 wherein said fire retardant composition comprises about 5% by weight of said at least one metal ferrite.

47. The method of claim 42 wherein said at least one suspending agent is at least one selected from a group consisting of Attapulgus clay, Sepiolite clay, Fuller's earth clay, Montmorillonite clay, Kaolin clay, and mixtures thereof.

48. The method of claim 42 wherein said intermediate concentrate composition further comprises at least one gum thickener.

49. The method of claim 48 wherein said at least one gum thickener is a biopolymer with a median particle diameter less than 100 microns.

50. A method of suppressing wildland fires comprising aerially applying to wildland vegetation a fire suppressing composition comprising the fire retardant composition of claim 14.

51. A method of suppressing wildland fires comprising aerially applying to wildland vegetation a fire suppressing composition comprising the fire retardant composition of claim 15.

* * * * *